United States Patent [19]

O'Dea et al.

[11] Patent Number: 5,805,640
[45] Date of Patent: Sep. 8, 1998

[54] METHOD AND APPARATUS FOR CONDITIONING MODULATED SIGNALS FOR DIGITAL COMMUNICATIONS

[75] Inventors: Robert J. O'Dea, Ft. Lauderdale; David L. Muri, Sunrise, both of Fla.

[73] Assignee: Motorola, Inc., Schaumburg, Ill.

[21] Appl. No.: 627,535

[22] Filed: Apr. 4, 1996

[51] Int. Cl.[6] .................................................. H04K 1/02
[52] U.S. Cl. ........................................ 375/296; 332/103
[58] Field of Search .................................. 375/296, 295, 375/298, 302, 308; 327/58, 62; 332/103

[56] References Cited

U.S. PATENT DOCUMENTS 4,646,326  2/1987  Backof, Jr. et al. ................... 375/261

Primary Examiner—Tesfaldet Bocure
Assistant Examiner—Bryan Webster
Attorney, Agent, or Firm—Andrew S. Fuller

[57] ABSTRACT

A digitally modulated signal is conditioned, such as to facilitate amplification. The digitally modulated signal is derived from an information stream which is mapped onto a symbol constellation to generate a sequence of channel symbols. The sequence of channel symbols is processed to provide a conditioned signal having a signal envelope that avoids signal envelope magnitudes below a threshold value (500). From a signal envelope representing the sequence of channel symbols, symbol interval minimum values are determined as the signal envelope transitions through successive channel symbols of the sequence (510). The conditioned signal is generated by localized adjustment of the signal envelope, such as by insertion of an adjustment pulse, to increase a particular symbol interval minimum value, when that value is below the threshold value (520, 530, 540, 545, 555).

19 Claims, 3 Drawing Sheets

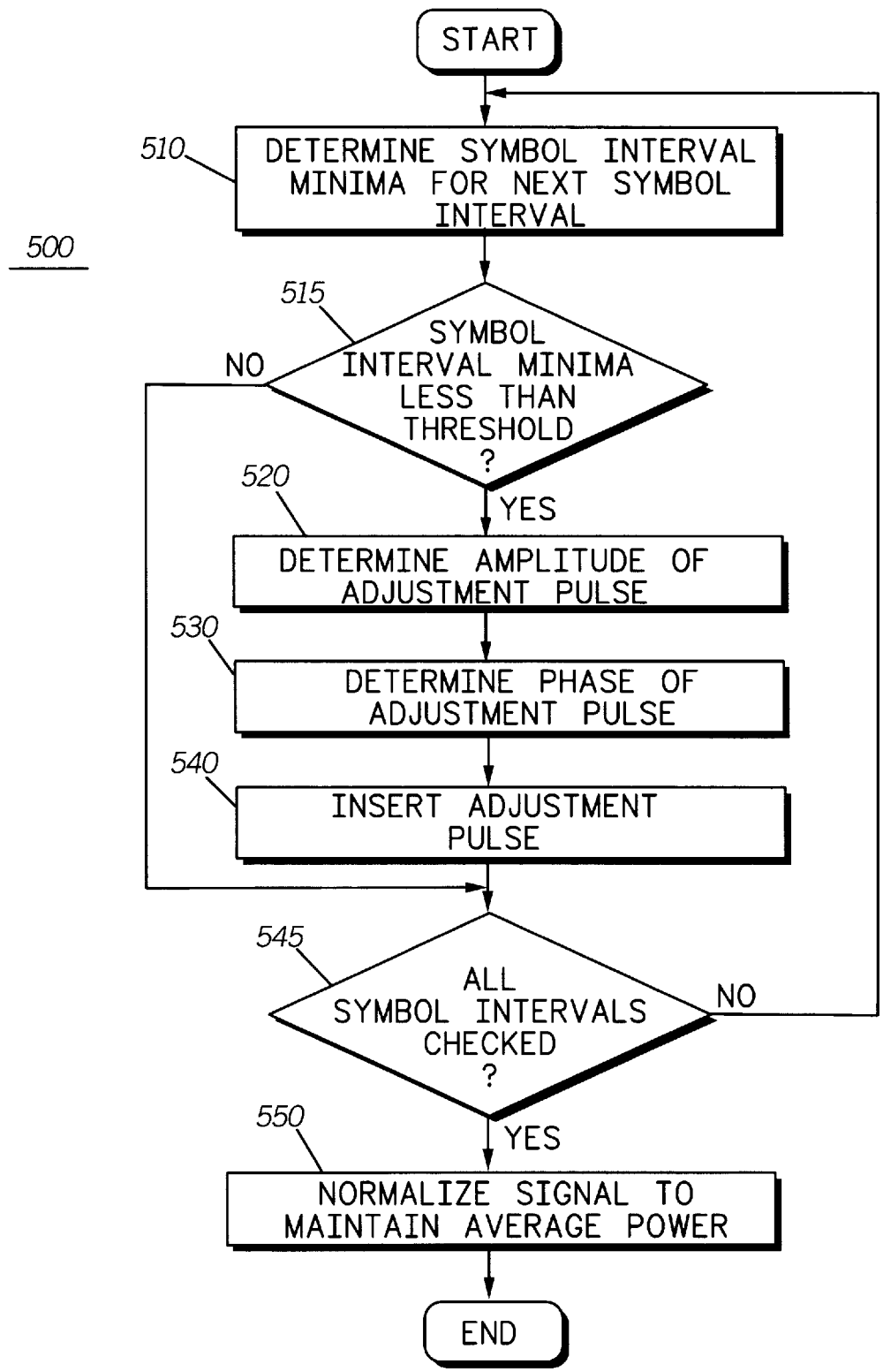

METHOD AND APPARATUS FOR CONDITIONING MODULATED SIGNALS FOR DIGITAL COMMUNICATIONS

TECHNICAL FIELD

This invention relates in general to communication systems, and more particularly, to the conditioning of a digitally modulated signal, such as for amplification purposes.

BACKGROUND

Contemporary communication systems often employ digital signals to effect communications. In a typical digital radio communication device, the transmitted source information is represented by a digital information stream. This digital information stream is modulated and amplified for transmission over a communication channel. Many complex digital modulation schemes have been developed to efficiently convey information across a communication channel. Depending on the digital modulation scheme used, a resultant transmitted signal may have a signal envelope with substantial variation or dynamic range. The dynamic range of the transmitted signal envelope affects the design and selection of a power amplifier used to amplify the communication signals before transmission.

Typically, the power amplifier must accommodate the variations in the signal envelope without distorting the transmitted signal. Distortion of the transmitted signal can cause undesirable effects, such as spectral spreading of the signal energy into adjacent communication channels and degradation to the receiver sensitivity. To avoid signal distortion, the power amplifier is designed to linearly amplify the transmitted signal over its complete dynamic range.

The operating characteristics of conventional power amplifiers dictate that the amplifier efficiency increases monotonically with the value of the signal envelope. A constant signal envelope modulation, such as frequency modulation (FM), allows a power amplifier to be designed to operate continuously at peak efficiency. However, when the value of the transmitted signal envelope varies with time, the overall amplifier efficiency will be significantly less than peak efficiency. In a battery powered communication device, this reduction in amplifier efficiency results in reduced battery life. Amplifiers that accommodate large signal dynamic ranges are also relatively expensive to develop and produce, when compared to amplifiers for constant signal envelope signals.

Known power amplification techniques such as Doherty, Supply Modulation, and LINC (linear amplification with nonlinear components), are designed to amplify signals having a varying signal envelope without distorting the signal, while simultaneously providing improved power efficiency. However, with these amplification techniques, it is expensive to accommodate signals with a large dynamic range while maintaining good performance. Consequently, use of a particular modulation scheme with a varying signal envelope may preclude the selection of certain amplifier designs because of cost and performance issues.

The reduction of power consumption has become an increasingly important aspect of the design of a radio communication device. The provision of an efficient power amplification for transmitted signals is a critical component in reducing power consumption. However, some modulation schemes used to maximize spectral efficiency may have 60 dB or more amplitude dynamic range, which limit the ability to use efficient amplification techniques. It is desirable to facilitate the efficient amplification of modulated signals while avoiding problems associated with prior art devices.

BRIEF DESCRIPTION OF THE DRAWINGS

FIG. 5 is a flowchart of procedures for operating the pulse symbol injector, in accordance with the present invention.

DETAILED DESCRIPTION OF THE PREFERRED EMBODIMENT

The present invention provides for the conditioning of a digitally modulated signal, such as to enhance amplifier performance in a digital transmitter. For digital modulation, a digital information stream is mapped onto a symbol constellation to generate a sequence of channel symbols. The sequence of channel symbols is processed to provide a conditioned signal having a signal envelope that avoids signal envelope magnitudes below a minima threshold. Preferably, symbol interval minimas are determined with respect to a signal envelope representing the sequence of channel symbols. A symbol interval minima is the minimum value of the signal envelope during a transition through two symbols occurring successively within the sequence. The conditioned signal reflects adjustments made to the signal envelope to avoid symbol interval minimas below the minima threshold. In the preferred embodiment, the signal envelope is modified by inserting an adjustment symbol or pulse between selected channel symbols.

Figure 1:
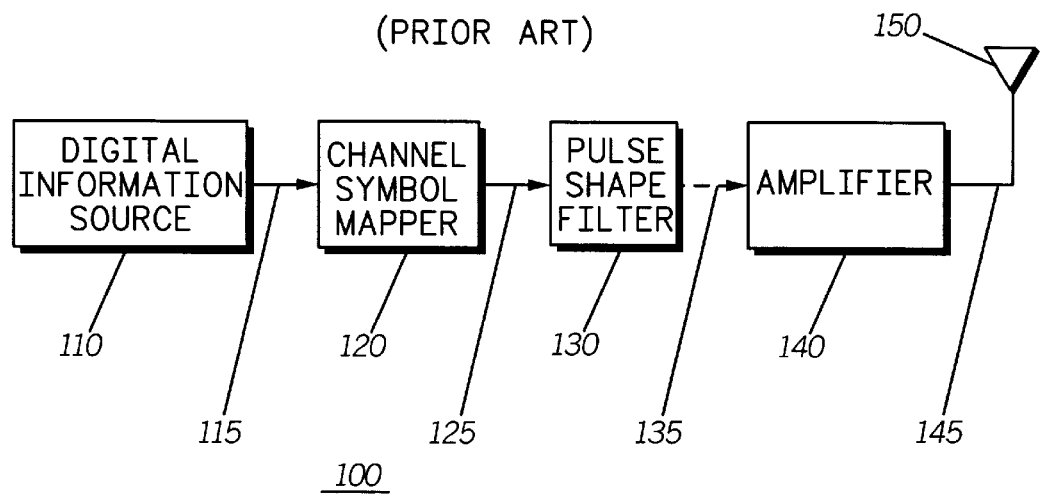
FIG. 1 is a block diagram of a portion of a prior art communication device, capable of transmitting digital information using a Quadrature Amplitude Modulation (QAM) signal.

Referring to FIG. 1, a prior art communication device 100 is shown, that incorporates elements commonly found in a device providing linear transmission of digitally modulated signals. The communication device 100 includes a digital information source 110, such as a voice encoder, that generates a stream of digital information 115. A channel symbol mapper 120 is coupled to the stream of information 115 and provides digital modulation. In the example shown, a linear modulation scheme such as Quadrature Amplitude Modulation (QAM) is used. The QAM signaling scheme utilizes both the phase and amplitude of a carrier signal to transmit information, and has a relatively high peak-to-average power ratio. The channel symbol mapper 120 outputs a modulated signal comprising a sequence of channel symbols 125, and the modulated signal is coupled to a pulse shape filter 130. The pulse shape filter 130 provides a bandwidth limiting function to limit the signal spectrum. The filter 130 outputs a digitally filtered signal 135 which is ultimately coupled to an amplifier 140. The amplifier 140 outputs an amplified signal 145 that is radiated through an antenna 150.

Figure 2:
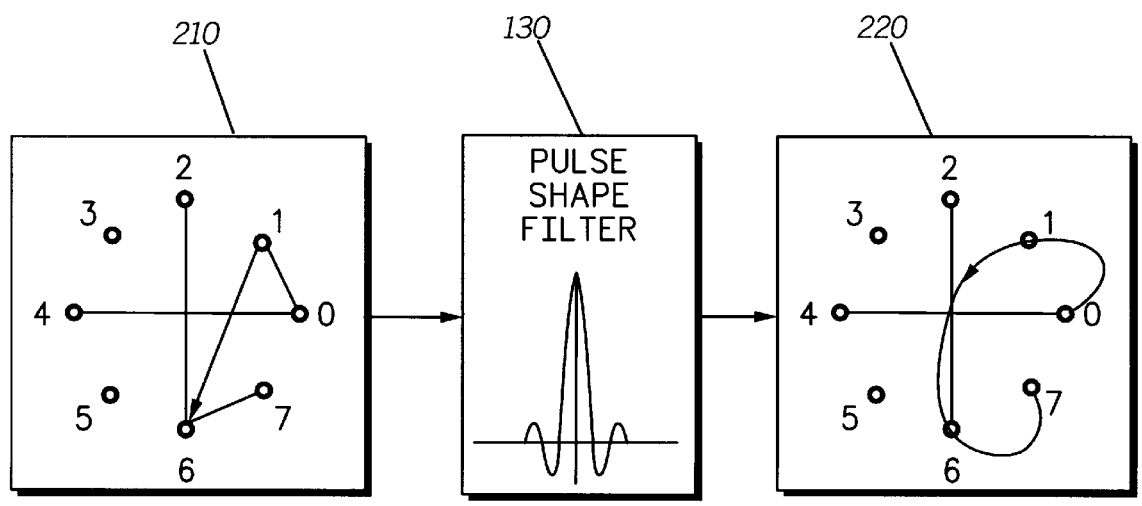
FIG. 2 is a diagram depicting the impact of pulse shape filtering on a QAM based digitally modulated signal, as processed by the prior art device of FIG. 1.

FIG. 2 shows a graphical representation 200 of the impact of the pulse shape filter in the prior art communication device 100. For the purposes of illustration, it is assumed that a π/4 quadrature phase shift keying (QPSK) modulation scheme is employed. As is common in the art, a symbol constellation for a π/4 QPSK modulation scheme can be represented graphically as a set of symbols in a two-dimensional structure representing phase and amplitude. Graphical block 210 is a representation of a channel symbol sequence having values {0, 1, 6, 7} generated by the channel symbol mapper 120 to represent a sample digital information stream. Note that in this modulation scheme, straight line transitions between successive symbols do not cross the origin, i.e., no transition has a point at which the amplitude and phase have a value of zero(0).

Figure 3:
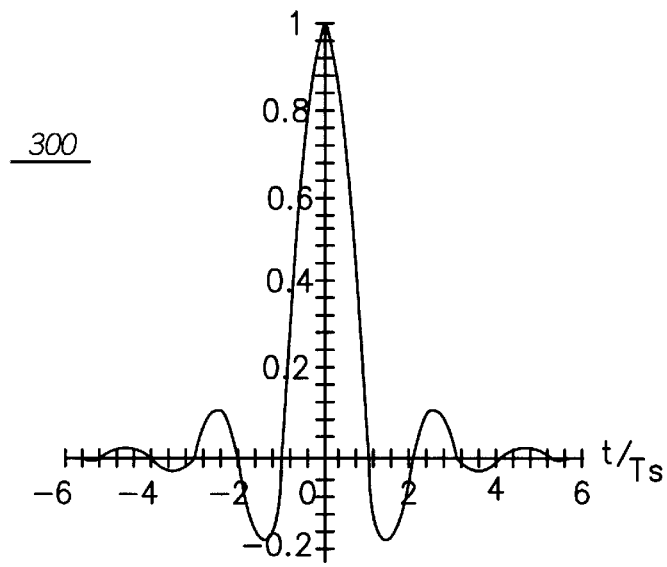
FIG. 3 is a graph depicting the time domain response of a pulse shape filter.

As in a typical implementation incorporating the π/4 QPSK modulation scheme, the filter 130 is a raised cosine rolloff pulse shape filter with a predetermined rolloff factor. FIG. 3 is a graph 300 showing a time domain response of the filter 130. The output of the filter 130 is expected to include superimposed responses of the filter to multiple channel symbols. Assume that the sequence of symbols has a symbol period $T_s$ representing the time between successive symbols. A pulse from the pulse shape filter crosses zero at multiples of the symbol period $T_s$, and the value of the composite signal at multiples of $T_s$ will be equal to the channel symbol corresponding to that symbol time. A minimum value of the signal envelope will occur between symbol transitions.

Graphical block 220 is a representation of the signal envelope or signal trajectory representing the sequence of channel symbols {0, 1, 6, 7} after being processed by the pulse shape filter 130. When pulse shape filtering is applied to the sequence of channel symbols to limit signal spectrum, certain symbol transitions can cause the signal envelope to have a very small value. This is primarily due to the characteristic ringing of the pulse shape filter, which causes the signal phase and amplitude, during symbol transitions, to be a function of multiple symbols. Thus, the straight transitions between channel symbols, as evidence in graph 210, are replaced by random non-linear transitions that produce extremely small signal envelope values. This impact of filtering increases as the filter rolloff factor or signal bandwidth is reduced.

In the example shown, the signal envelope for the symbol sequence {0, 1, 6, 7} takes a path that passes near the origin during the transition from channel symbol {1} to channel symbol {6}. Extremely small values of the signal envelope makes difficult the use of highly efficient linear amplification techniques such as supply modulation LINC and contribute to decoding errors when certain differential detection techniques are employed to process transmitted signals at a receiver.

For the purposes of this discussion, the portion of the signal envelope occurring during the transition between one channel symbol and a successive channel symbol is referred to herein as a symbol interval. A symbol interval minima is defined, with respect to a particular symbol interval, as the minimum value of the signal envelope during the particular symbol interval. This minimum value is determined by the minimum distance from the origin to the trajectory of the signal envelope during the symbol interval.

According to the present invention, the modulated signal is processed or conditioned, preferably based on the impact of the spectral shaping filter used to filter the modulated signal, to avoid modulated signal envelope values below a particular minima threshold. Such signal conditioning facilitates the use of efficient linear amplification techniques requiring a limited signal dynamic range.

Figure 4:
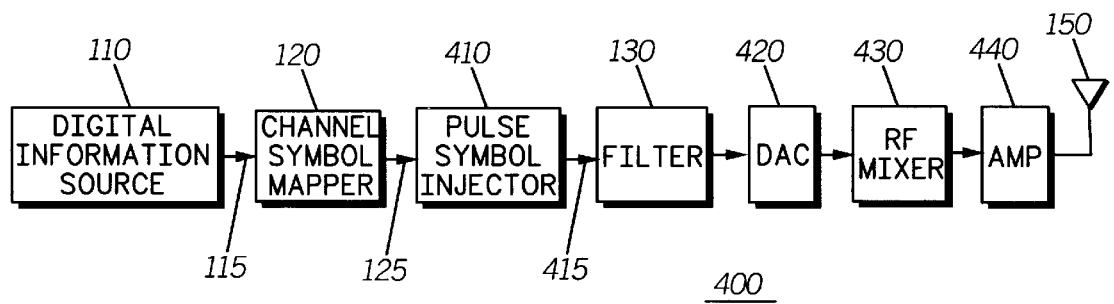
FIG. 4 is a block diagram of a digital linear transmitter in a communication device, the transmitter incorporating a pulse symbol injector, in accordance with the present invention.

FIG. 4 is a block diagram of a transmitter portion of a digital communication device, in accordance with the present invention. As in the prior art device 100 (FIG. 1), the device 400 includes a digital information source 110, a channel symbol mapper 120, a filter 130, and an antenna 150, having all the functions as previously described. The device 400 further includes a digital-to-analog converter (DAC) 420, coupled to the output of the filter 130. A radio frequency (RF) mixer 430 is coupled at the output of the DAC 420, and a high efficiency linear amplifier 440, such as a LINC amplifier, coupled to the output of the RF mixer 430. The output of the amplifier 440 is coupled to the antenna 150.

In accordance with the present invention, the communication device includes a pulse symbol injector 410, preferably interposed between the channel symbol mapper 120 and the filter 130. The pulse symbol injector 410 augments the sequence of channel symbols 125 generated at the channel symbol mapper 120, by selectively inserting pulses, or pulse symbols, between certain channel symbols to produce a conditioned symbol sequence that comprises channel symbols and pulses. This conditioned symbol sequence 415 is used an input to the filter 130. In the preferred embodiment, the pulse symbol injector 410 operates to selectively insert adjustment or pulse symbols within the sequence between selected channel symbols of the sequence 125 representing the digitally modulated signal. Preferably, the adjustment pulses are based in part on the expected response of the spectral shaping filter 130, which in the preferred embodiment is a raised cosine rolloff pulse shape filter.

Signal conditioning is performed to counter the impact of filtering on the signal envelope of the modulated signal. It can be shown that the magnitude of the portion of the signal envelope during transitions between channel symbols can be modified by inserting adjustment pulses therebetween. The adjustment pulses are selected to alter the transitionary signal envelope without significantly impacting, if at all, the bordering channel symbols.

Assume that a digital linear modulation signaling scheme uses a two-dimensional RF signaling format which can be written as:

$$s(t) = \sum_{k=-\infty}^{\infty} (x_k \cos(w_o t) - y_k \sin(w_o t)) p(t - kT_S) = Re[d(t)\exp(jw_o t)]$$

where d(t) is the complex envelope of s(t) given by $$d(t) = \sum_{k=-\infty}^{\infty} d_k p(t - kT_S);$$

and where $d_k = x_k + jy_k$, p(t) is the pulse shape, $T_s$ is the symbol duration, and $x_k$ and $y_k$ are the in-phase(I) and quadrature(Q) components of the $k^{th}$ channel symbol $d_k$, respectively. The instantaneous signal magnitude in s(t), $P_s(t)$, can be expressed as:

$$P_S(t) = \left| \sum_{k=-\infty}^{\infty} d_k p(t - kT_S) \right| \leq \sum_{k=-\infty}^{\infty} |d_k| p(t - kT_S)$$

where the inequality becomes an equality if the channel symbols have phases that cause each term to add constructively. The summation need only include the symbols that contribute to the signal value at a given point. The number of symbols to be included in the summation is determined by the duration of the ringing in the pulse shape filter response.

By including one or more adjustment pulses with a small magnitude and appropriate phase between selected channel symbols, the magnitude of signal envelope between the selected channel symbols can be affected, while th e signal envelope at the selected channel symbols remain relatively unaffected. Accordingly, the pulse symbol injector 410 operates to insert adjustment pulses that influences a signal envelope minimum value that falls below a preselected threshold value, such that the signal envelope magnitude is increased.

FIG. 5 is a flowchart of procedures 500 for the pulse symbol injector of the preferred embodiment. In summary, the digital information stream is first mapped onto a symbol constellation, such as using a $\pi/4$ QPSK modulation scheme, to generate a sequence of channel symbols. The procedure then operates to determine, with respect to a signal envelope representing the sequence of channel symbols, symbol interval minimas corresponding to signal transitions between successive channel symbols of the sequence. A modified modulated signal is then generated by inserting adjustment pulse symbols between at least some channel symbols of the sequence to avoid symbol interval minimas having values below a minima threshold.

The pulse symbol injector determines a symbol interval minima, Mins, for a particular symbol interval, step 510. Preferably, the symbol interval minima corresponds to a particular transition between two channel symbols occurring successively. When Mins is less than a particular minima threshold, Mind, step 515, the magnitude and phase of an adjustment pulse symbol is determined based on an expected response of the pulse shape filter, or other spectral shaping filter, that processes the sequence of channel symbols, steps 520, 530, 540. Preferably, the magnitude (amplitude) of the adjustment pulse symbol is generated based at least in part on a difference between the particular symbol interval minima and the minima threshold, step 520. In the preferred embodiment, the adjustment pulse symbol magnitude M=(Mind−Mins).

A phase, $Ph_{adj}$, is also determined for the adjustment pulse symbol, step 530. The phase, $Ph_{adj}$ is based on a symbol phase value, $Ph_s$, determined for a channel symbol adjacent to the particular symbol interval minima, and a signal phase rotation, $Ph_r$, corresponding to the signal envelope as it transitions between the particular channel symbol and a successive channel symbol. In the preferred embodiment, the phase, $Ph_{adj}$, is calculated by the formula: $Ph_{adj}=Ph_s+Ph_r/2$. Preferably, the adjustment pulse symbol of magnitude M and a phase $Ph_{adj}$, is inserted midway between the adjacent channel symbols, step 540.

All symbol intervals in a particular sequence of channel symbols are checked for symbol interval minima less than the minima threshold, and adjustment pulse symbols inserted where appropriate. The adjustment pulse symbols are selected to minimize the impact on the primary channel symbols. Additional processing may be performed, such as to normalize the conditioned signal to maintain the average power of the pre-conditioned signal, step 550. The entire process is repeated iteratively until there are no symbol intervals minimas less than the minima threshold. This process in effect creates a "hole" around the origin for the signal envelope, i.e., there are no crossings at or near the origin by the signal envelope.

The algorithm employed by the pulse symbol injector of the preferred embodiment can be summarized as follows:

1. Determine $Min_s$, on the ith symbol interval, i.e., between the $i^{th}$ and $(i+1)^{th}$ symbol.
2. If $Min_s$ is less than $Min_d$, then:
   (a) Set the pulse symbol magnitude M =($Min_d$−$Min_s$)
   (b) Determine the signal phase rotation $Ph_r$ on the $i^{th}$ symbol interval.
   (c) Determine the phase of the $i^{th}$ symbol $Ph_s$.
   (d) Set the adjustment phase $Ph_{adj}=Ph_s+Ph_r/2$.
   (e) Insert a pulse symbol of magnitude M and phase $Ph_{adj}$ between the $i^{th}$ and $(i+1)^{th}$ symbols.
3. Repeat Steps 1 and 2 for all symbol intervals.

The functions of the above described procedure can be implemented in a digital signal processor by algorithm, such as in conjunction with a look-up table, with minimal impact on hardware design, modulation system design, and the like. Furthermore, there is negligible adverse impact on performance parameters such as signal transmission bandwidth.

Figure 6:
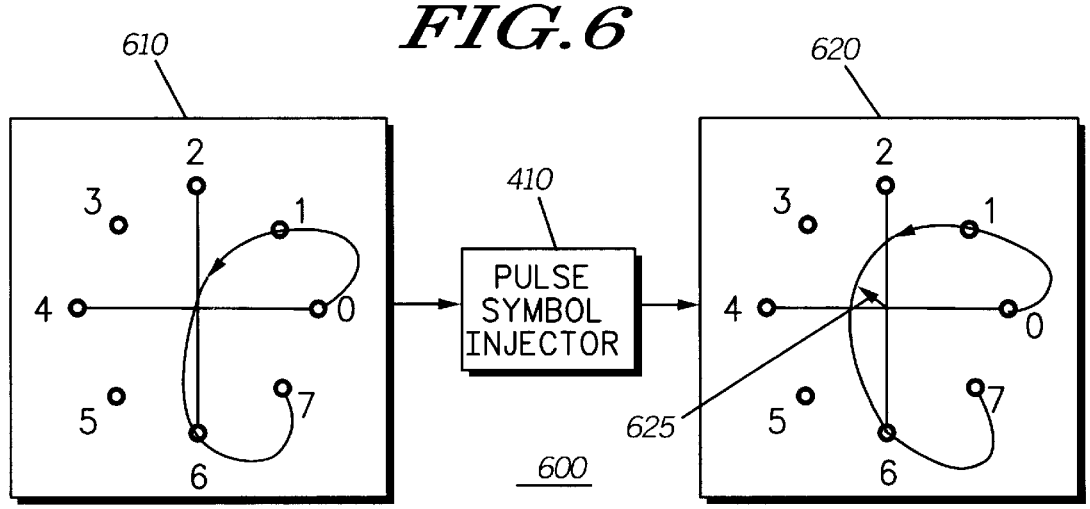
FIG. 6 is a diagram comparing the trajectory of a signal with and without the pulse symbol injector, in accordance with the present invention.

FIG. 6 shows a block representation 600 of the transformation of the signal envelope after pulse shape filtering, when the pulse symbol injector is used, in accordance with the present invention. Graph 610 shows a pulse shape filtered signal envelope transitioning through the symbol sequence {0, 1, 6, 7} when the pulse symbol injector is not used. Graph 620 shows the pulse shaped filtered signal envelope transitioning through the same sequence of symbols {0, 1, 6, 7} when the pulse symbol injector is used. From graph 610, it is seen that the signal envelope passes close to the origin when transitioning on the symbol interval {1, 6}. Hence, the minimum value of the signal envelope, i.e., the symbol interval minima, is close to zero for the symbol interval {1, 6}.

According to the present invention, the pulse symbol injector inserts one or more adjustment pulse symbols 625 to supplement the channel symbols of the sequence in order to avoid symbol interval minimas having values below a particular minima threshold. In the preferred embodiment, when a symbol interval minima is below a minima threshold, an adjustment pulse symbol is inserted between the two channel symbols bordering the particular symbol interval minima are adjusted. An adjustment pulse symbol is based on the response of the filter. In the example under discussion, an adjustment pulse symbol is inserted between channel symbol {1} and channel symbol {6} having a magnitude and phase so as not to impact these channel symbols. Thus, the resultant signal envelope passes through the adjustment pulse symbol, rather than at or near the origin, when the signal envelope transitions between both symbols {1, 6}, thereby avoiding the origin by at least the minima threshold amount.

The present invention provides a technique for removing extremely small signal envelope values for a filtered digitally modulated signal by adjusting characteristics of channel symbols, preferably prior to the application of spectral shaping filtering. In the preferred embodiment, channel symbols are modified by inserting supplementary pulses between adjacent channel symbols. While the discussion used the $\pi/4$ QPSK modulation scheme as an example, the concepts taught herein are equally applicable to other digital linear modulation schemes, and is not limited to any particular type of spectral shaping filter. Consider that the concepts could be applied to multiple channels or to a modulation scheme that utilizes multiple channels to transmit information. In such a system, the composite signal envelope can experience minimum values at or near symbol times, and the pulse insertion algorithm would be correspondingly modified to locate and adjust these minimum values.

The elimination of extremely small signal envelope minima provides significant benefits. For example, the use of the LINC power amplifier technique is facilitated by the creation of a signal envelope "hole" around the origin. This hole eliminates the need for extremely accurate phase resolution and reduces the bandwidth requirements in the LINC amplifier. In another example of a benefit, signal decoding is facilitated at a receiver processing a signal created according to the present invention. A differential phase detector sometimes utilized at the receiver is responsive to noise that can result in an error when the noise pushes the symbol transition to an opposite side of the origin. By moving the signal envelope away from the origin, the likelihood of this type of error is reduced.

What is claimed is:

1. A method for conditioning a digitally modulated signal, comprising the steps of:

mapping a digital information stream onto a symbol constellation to generate a sequence of channel symbols;

processing the sequence of channel symbols to provide a conditioned signal having a signal envelope that avoids signal envelope magnitudes below a minima threshold, including the steps of:

determining symbol interval minimum values for a signal envelope of a representative signal for the sequence of channel symbols when processed through a spectral shaping filter; and generating the conditioned signal by adjusting the signal envelope of the representative signal by inserting an adjustment pulse between first and second channel symbols of the sequence of channel symbols to increase a particular symbol interval minimum value, when the particular symbol interval minimum value is below the minima threshold.

2. The method of claim 1, wherein the adjustment pulse has a magnitude based at least in part on a difference between the particular symbol interval minimum value and the minima threshold, and the adjustment pulse has a phase adjustment based at least in part on a signal phase rotation for the signal envelope when transitioning between the first and second channel symbols, and on a symbol phase for the first channel symbol.

3. The method of claim 2, wherein the first and second channel symbols occurs successively in the sequence.

4. A method for conditioning a digitally modulated signal, comprising the steps of:

mapping a digital information stream onto a symbol constellation to generate a sequence of channel symbols; and processing the sequence of channel symbols to provide a conditioned signal having a signal envelope that avoids signal envelope magnitudes below a minima threshold;

wherein the step of processing comprises the steps of:

(a) determining that a minimum signal envelope value, $Min_s$, corresponding to a representative signal envelope transitioning between first and second channel symbols occurring successively in the sequence, is below the minima threshold, $Min_d$;

when $Min_s$ is less than $Min_d$:

(b) generating a magnitude value, $M=Min_d-Min_s$;

(c) determining a signal phase rotation, $Ph_r$, for the signal envelope when transitioning between the first and second channel symbols;

(d) determining a phase, $Ph_s$, for the first channel symbol;

(e) generating a phase value, $Ph_{adj}$, wherein $Ph_{adj}=Ph_s+Ph_r/2$; and (f) inserting an adjustment pulse midway between the first and second symbols, the adjustment pulse having a magnitude M and a phase $Ph_{adj}$.

5. The method of claim 4 wherein the step of processing further comprises the step of repeating steps (a) through (f) for all transitions of the signal envelope between successive channel symbols of the sequence.

6. A method for processing a digital information stream in a digital transmitter that includes a spectral shaping filter, comprising the steps of:

mapping the digital information stream onto a symbol constellation to generate a sequence of symbols;

determining, with respect to a signal envelope representing the sequence of symbols, symbol interval minimas, wherein a symbol interval minima corresponds to a minimum value of the signal envelope during a transition between two symbols occurring successively within the sequence;

selectively inserting at least one adjustment pulse between successive symbols of the sequence of symbols to avoid symbol interval minimas below a minima threshold, thereby generating a conditioned digitally modulated signal;

processing the conditioned digitally modulated signal with the spectral shaping filter to generate a filtered signal; and coupling the filtered signal to an amplifier.

7. The method of claim 6, wherein the step of selectively inserting at least one adjustment pulse comprises the step of:

determining whether a particular symbol interval minima is below the minima threshold;

when the particular symbol interval minima is below the minima threshold, adding an adjustment pulse having a magnitude based at least in part on a difference between the particular symbol interval minima and the minima threshold, the adjustment pulse having a phase based at least in part on a signal phase rotation for a transition of the signal envelope between first and second channel symbols, and based on a symbol phase of the first channel symbol.

8. The method of claim 6, wherein the step of selectively inserting comprises the steps of:

(a) determining whether a particular symbol interval minima, $Min_s$, corresponding to a transition of the signal envelope between first and second channel symbols occurring successively in the sequence, is below the minima threshold, $Min_d$;

when $Min_s$ is less than $Min_d$:

(b) generating a magnitude value, $M=Min_d-Min_s$;

(c) determining a signal phase rotation, $Ph_r$, for the signal envelope when transitioning between the first and second channel symbols;

(d) determining a phase, $Ph_s$, for the first channel symbol;

(e) generating a phase value, $Ph_{adj}$, wherein $Ph_{adj}=Ph_s+Ph_r/2$; and (f) inserting an adjustment pulse midway between the first and second channel symbols, the adjustment pulse having a magnitude M and a phase $Ph_{adj}$.

9. The method of claim 8, wherein the step of selectively inserting further comprises the step of repeating steps (a) through (f) for all signal envelope transitions between successive channel symbols of the sequence.

10. A digital transmitter, comprising:

a digital information source providing a digital information signal;

a channel symbol mapper coupled to digital information source, and being operable to map the digital information signal to a sequence of channel symbols according to a symbol constellation, thereby generating a modulated signal; and a signal conditioner coupled to the channel symbol mapper, and being operable to determine, with respect to a signal envelope representing the sequence of symbols, symbol interval minimas, wherein a symbol interval minima corresponds to a minimum value of the signal envelope during a transition between two symbols occurring successively within the sequence, the signal conditioner being operable to adjust the signal envelope to avoid symbol interval minimas below a minima threshold, thereby generating a conditioned signal;

wherein the signal conditioner comprises a pulse injector that selectively inserts an adjustment pulse within the modulated signal during transitions of the signal envelope between selected channel symbols of the sequence.

11. The digital transmitter of claim 10, wherein the pulse injector inserts an adjustment pulse between first and second channel symbols of the sequence bordering a particular symbol interval minima, when the particular symbol interval minima is below the minima threshold.

12. The digital transmitter of claim 11, wherein the adjustment pulse has a magnitude based at least in part on a difference between the particular symbol interval minima and the minima threshold, and the adjustment pulse has a phase adjustment based at least in part on a signal phase rotation for the signal envelope for the transition between the first and second channel symbols, and on a symbol phase for the first channel symbol.

13. The digital transmitter of claim 10, wherein the pulse injector operates to select first and second channel symbols, occurring successively, when the signal envelope has a minimum value, $Min_s$, less than the minima threshold, $Min_d$, while transitioning between first and second channel symbols occurring successively in the sequence, and the pulse injector operates to insert between the first and second channel symbols, an adjustment pulse of magnitude M and phase $Ph_{adj}$, where:

$M = Min_d - Min_s$;

$Ph_{adj} = Ph_s + Ph_r/2$;

$Ph_r$ is a signal phase rotation for the signal envelope when transitioning between the first and second channel symbols; and $Ph_s$ is a phase value for the first channel symbol.

14. The digital transmitter of claim 10, further comprising a spectral shaping filter coupled to the pulse injector and being responsive to the conditioned signal to generate a filtered modulated signal.

15. The digital transmitter of claim 14, wherein the pulse injector operates based at least in part on characteristics of the spectral shaping filter.

16. A digital transmitter, comprising:

a digital information source providing an digital information signal;

a channel symbol mapper coupled to digital information source, and being responsive to the digital information signal to generate a modulated signal comprising a sequence of channel symbols according to a symbol constellation;

a signal conditioner coupled to the channel symbol mapper, and being operable to determine, with respect to a signal envelope representing the sequence of channel symbols, symbol interval minimas, wherein a symbol interval minima corresponds to a minimum value of the signal envelope during a transition between two channel symbols occurring successively within the sequence, the signal conditioner being operable to adjust the signal envelope to avoid symbol interval minimas below a minima threshold, thereby generating a modified sequence of channel symbols;

a spectral shaping filter responsive to the modified modulated signal and having an output of a filtered symbol sequence; and an amplifier coupled to the output of the spectral shaping filter, and providing an amplified signal;

wherein the signal conditioner operates based at least in part on characteristics of the spectral shaping filter.

17. The digital transmitter of claim 16, wherein the signal conditioner selectively inserts an adjustment pulse between first and second channel symbols occurring successively, when the corresponding symbol interval minima is below a minima threshold.

18. The digital transmitter of claim 16, wherein the signal conditioner operates to select first and second channel symbols, occurring successively, that have a symbol interval minima, $Min_s$, below the minima threshold, $Min_d$, and toperates to insert between the first and second channel symbols, an adjustment pulse of magnitude M and phase $Ph_{adj}$, where:

$M = Min_d - Min_s$;

$Ph_{adj} = Ph_s + Ph_r/2$;

$Ph_r$ is a signal phase rotation for the signal envelope when transitioning between the first and second channel symbols; and $Ph_s$ is a phase value for the first channel symbol.

19. The digital transmitter of claim 16, wherein the symbol constellation corresponds to a $\pi/4$ QPSK modulation scheme.

* * * * *